United States Patent [19]
Morgenthaler et al.

[11] Patent Number: 4,626,188
[45] Date of Patent: Dec. 2, 1986

[54] DOUGH-ROLLING MACHINE

[75] Inventors: Eugen Morgenthaler; Jacques Rolli, both of Kirchberg, Switzerland

[73] Assignee: Seewer AG, Burgdorf, Switzerland

[21] Appl. No.: 613,057

[22] Filed: May 22, 1984

[30] Foreign Application Priority Data

May 27, 1983 [CH] Switzerland ............... 2918/83

[51] Int. Cl.[4] ........................... B29C 47/92
[52] U.S. Cl. .................. 425/145; 264/40.7; 425/194; 426/502
[58] Field of Search .......... 425/145, 298, 194, 363, 425/436 R, 436 RM, 377, 171, 172, 193; 264/40.7; 426/502

[56] References Cited

U.S. PATENT DOCUMENTS

| 1,646,980 | 10/1927 | Peglow | 425/363 |
| 1,753,393 | 4/1930 | Van Houten | 425/194 |
| 1,882,160 | 10/1932 | Paris | 425/363 |
| 1,931,614 | 10/1933 | Kirchhoff | 425/194 |
| 2,314,062 | 3/1943 | Alvey et al. | 425/363 |
| 2,480,505 | 8/1949 | Paterson | 425/193 |
| 2,687,698 | 8/1949 | Duffy | 425/363 |
| 2,687,699 | 4/1949 | Oakes | 425/363 |
| 3,753,638 | 8/1973 | Simpson | 425/363 |
| 4,336,010 | 6/1982 | Thompson | 425/145 |
| 4,398,877 | 8/1983 | Taylor | 425/145 |

Primary Examiner—Jan Silbaugh
Assistant Examiner—Jennifer Cabaniss
Attorney, Agent, or Firm—Salter & Michaelson

[57] ABSTRACT

The dough-rolling machine comprises two dough rollers, the upper one being adjustable in height. Two dough-conveyor belts are guided over inner conveyor-belt rollers. Between each of these rollers and the lower dough roller is a measuring roller. The dough is rolled out in several passes, one or the other of the conveyor belts serving alternately as the feed belt. The speed of rotation of the dough rollers is constant, as is the speed of the conveyor belt transporting the dough away from the dough rollers. The speed of the conveyor belt feeding the dough is adjustable and is regulated by means of the measuring roller measuring the actual rate of feed of the dough. Optimum control of this feed rate is important in order to avoid undulation or overstretching of the dough, which can destroy it, necessitate rerolling, or result in excessive rejects. The dough-rolling machine needs no operator.

13 Claims, 10 Drawing Figures

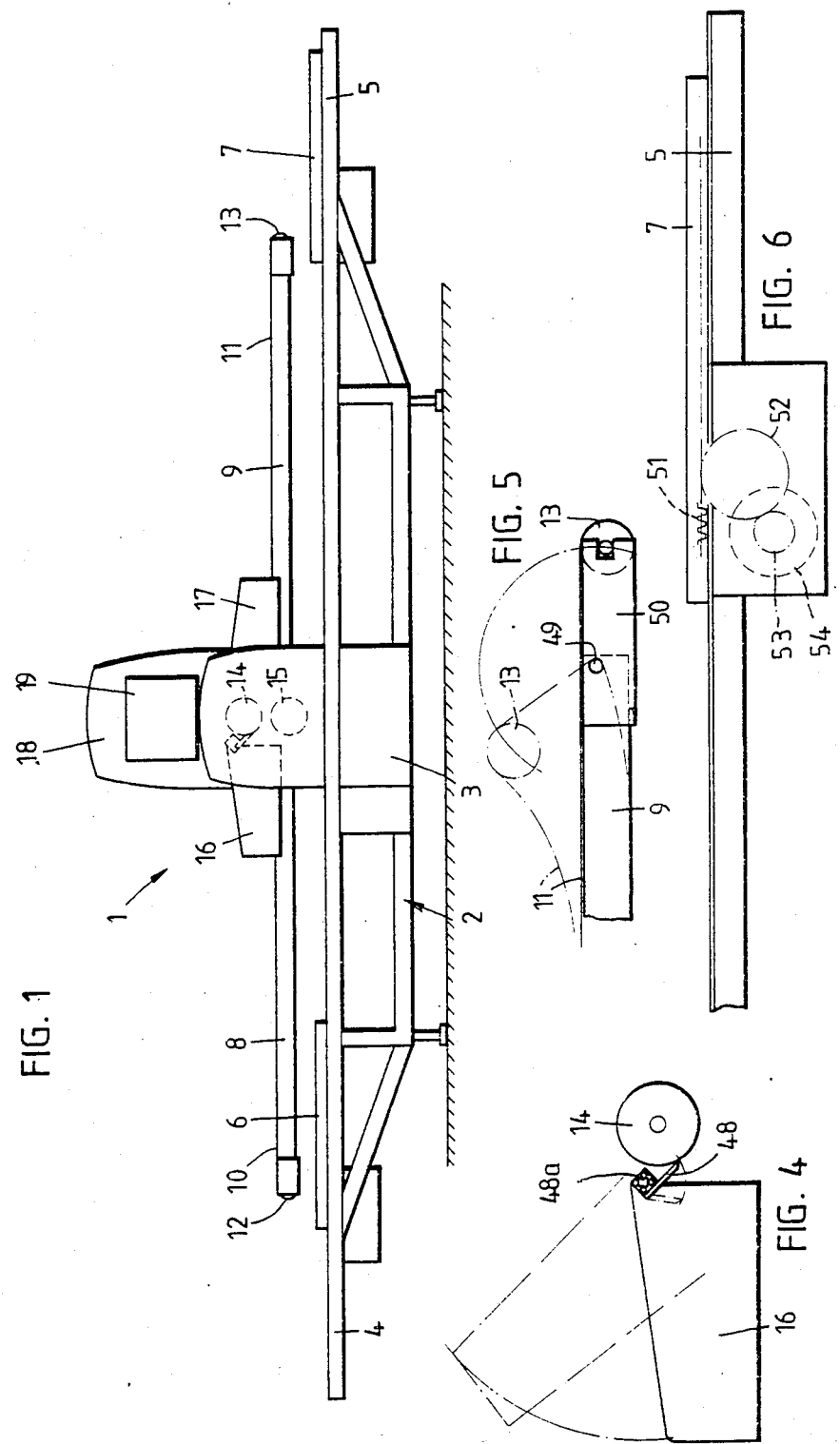

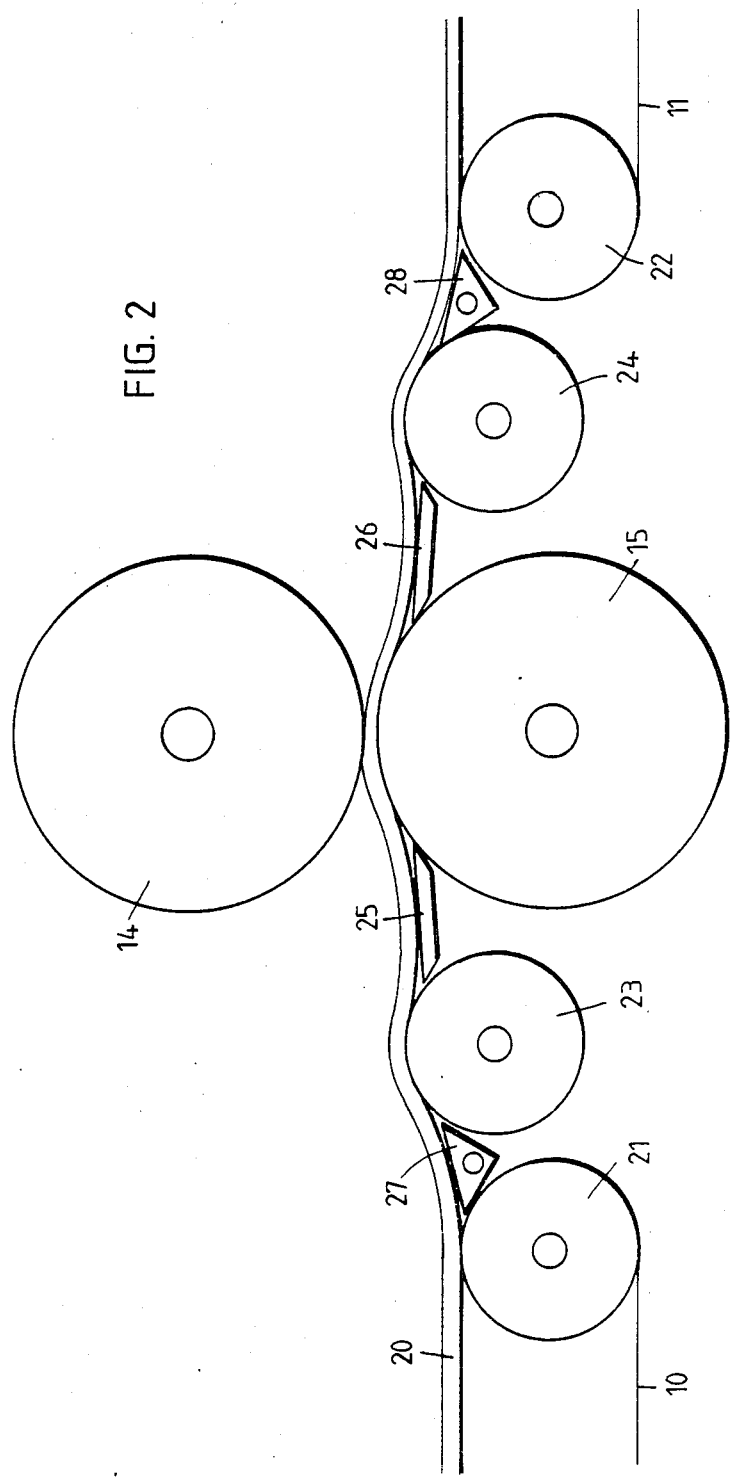

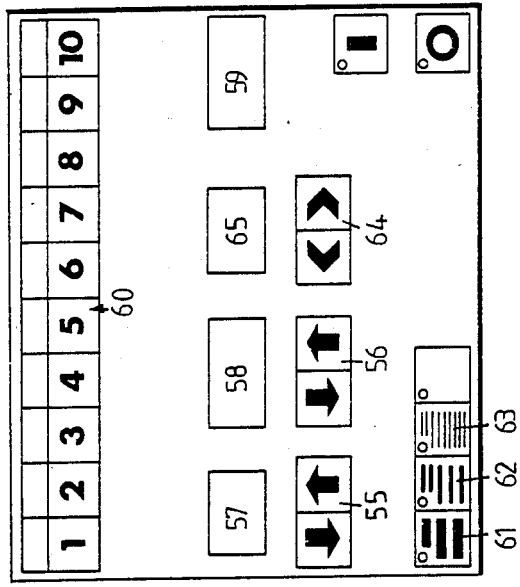
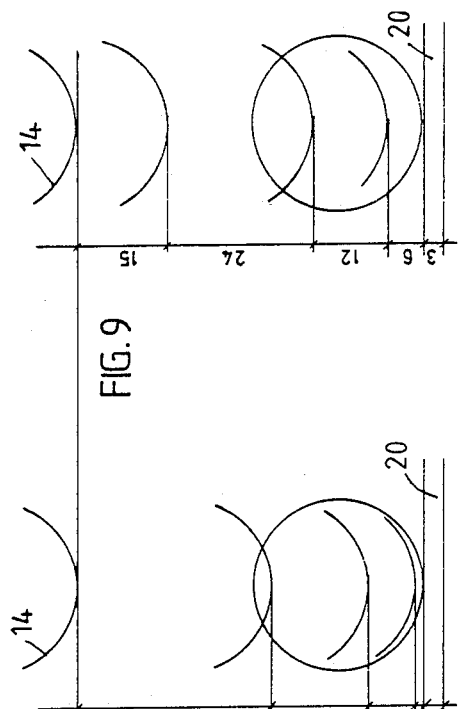
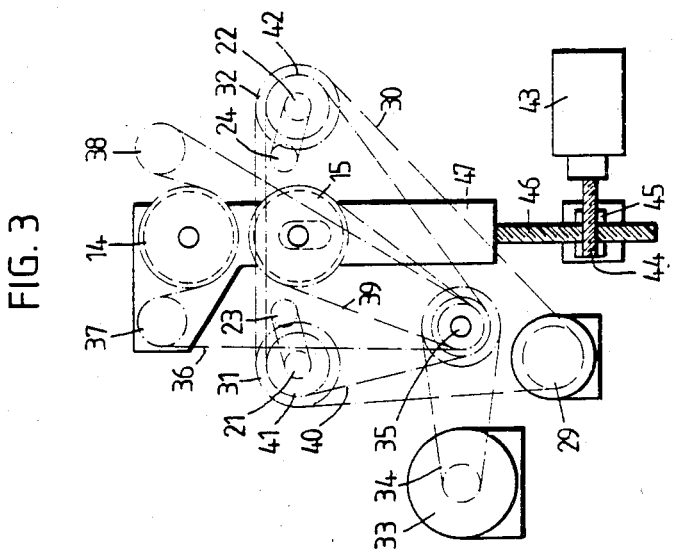

DOUGH-ROLLING MACHINE

This invention relates to baking equipment, and more particularly to a dough-rolling machine of the type having at least two dough rollers and devices for feeding the dough to and conveying it away from the dough rollers.

Prior art dough-rolling machines must be monitored by an operator who observes the passage of the dough through the rollers and regulates the speed of the conveyor drive rollers by means of a variator. Such monitoring is quite difficult and demanding, so it may happen with the machines used heretofore that the dough is pushed up against the rollers or tugged into them. This leads either to undulation of the dough, which destroys it or necessitates rerolling, or to overstretching of the dough, which leads to transverse shrinkage ("wire-drawing effect") and thus to rejects in the further processing of the dough.

It has also been proposed to regulate the roller speed by means of a compensating roller, for example, i.e., a spring-suspended roller which in a lower and upper position operates a switch, this roller responding to the weight of the dough; but this has the disadvantage of operating only when the dough is of a certain width and thickness. Furthermore, in such rolling machines, the dough must be manually fed in. In addition, operation takes place in only one direction.

It is an object of this invention to provide an improved dough-rolling machine which need not be monitored by an operator.

A further object is to provide a dough-rolling machine which has none of the aforementioned shortcomings during rolling of the dough.

Still another object of this invention is to provide a dough-rolling machine which yields dough of uniform quality with a minimum of stress, the width of the rolled-out dough remaining as constant as possible.

To this end, in the dough-rolling machine according to the present invention, of the type initially mentioned, the improvement comprises at least one measuring roller for measuring the actual speed of the dough prior to its passage through the dough rollers.

Another object of this invention is to enable optimum control of the gap between the dough rollers and of the speed of the feed means. This can be done by using a microprocessor in the centralized control.

A preferred embodiment of the invention will now be described in detail with reference to the accompanying drawings, in which:

FIG. 1 is an elevation of the dough-rolling machine as a whole,

FIG. 2 is a section through the various rollers,

FIG. 3 is a diagrammatic elevation showing how the various rollers are driven,

Figure 10:
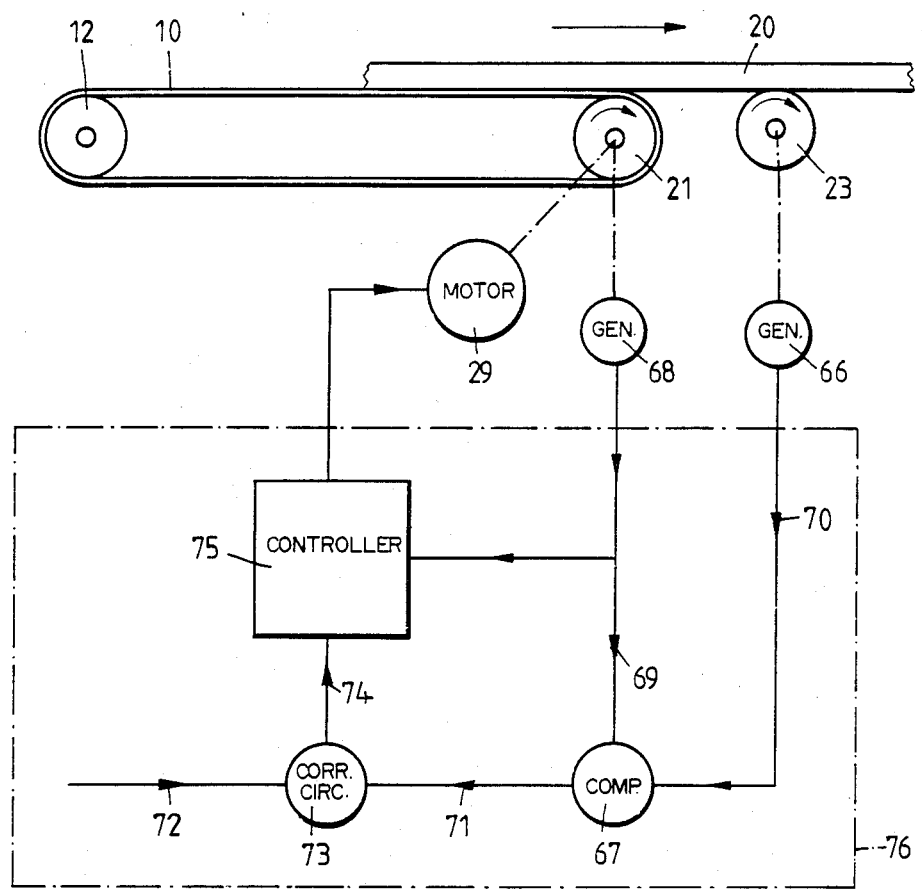

FIG. 4 is a detail elevation of a protective device with a roll-stripper and the upper dough roller, FIG. 5 is an elevation of the raisable end portion of a conveyor belt, FIG. 6 is a partial elevation showing a folding carriage with drive, FIG. 7 is a diagram of the control panel of the dough-rolling machine, FIG. 8 is a diagram illustrating the several positions of the upper dough roller with a partial step or increment at the end, FIG. 9 is a diagram similar to FIG. 8, but with a full step or increment at the end, and FIG. 10 is a block diagram of the dough-speed control.

As shown in FIG. 1, the dough-rolling machine comprises a frame 2 having a middle portion 3 for accommodating the control of the various rollers, hand-protectors 16–17, and a flour duster 19. Provided at the outer ends 4 and 5 of frame 2 are folding carriages 6 and 7. Two supports 8 and 9 for conveyor belts 10 and 11 are secured to middle portion 3. Belts 10 and 11 run over outer conveyor-belt rollers 12 and 13. An upper dough roller 14 and a lower dough roller 15 are indicated in broken lines in middle portion 3, as are hand-protecting devices 16 and 17 which are adjustable in height with the movable upper dough roller 14. A part 18 is provided for accommodating the drive elements (FIG. 3) and part of the electrical equipment. Flour duster 19 is disposed above rollers 14–15.

FIG. 2, a section through the various rollers of the dough-rolling machine, shows the dough 20 being fed by conveyor belt 10, running over one inner conveyor-belt roller 21, to dough rollers 14 and 15. The rolled-out dough is then led away by conveyor belt 11 ruunning over another inner conveyor belt roller 22. Two measuring rollers 23 and 24 are further provided between inner conveyor-belt rollers 21 and 22, respectively, and the fixed lower dough roller 15. Disposed between inner conveyor-belt roller 21 and measuring roller 23, as well as between rollers 22 and 24, are pivoting transfer parts 27 and 28, respectively. When the dough travels from left to right, as viewed in FIG. 2, transfer part 27 rests against roller 21 and transfer part 28 against roller 24. When the dough travels in the opposite direction, the positions of pivoting transfer parts 27 and 28 are reversed. The function of parts 27 and 28 is to keep measuring rollers 23 and 24 clean and to guide the dough from the one conveyor-belt roller to the associated measuring roller and vice versa. Fixed transfer parts 25 and 26 are provided for guiding the dough from the one measuring roller onto lower dough roller 15 and from the latter to the other measuring roller. The measuring rollers can be either coupled to the conveyor-belt rollers or left freely rotatable, depending upon the direction of travel of the dough. Dough rollers 14 and 15 are set to rotate at an unvarying speed. When the dough travels from left to right, as viewed in FIG. 2, conveyor-belt roller 22 rotates at a fixed speed, while the speed of conveyor-belt roller 21 is variable. When the direction of travel is reversed, i.e., from right to left as viewed in FIG. 2, the speed of roller 21 is fixed and that of roller 22 variable. The function of measuring rollers 23 and 24 is to measure the entry speed of the dough, the measured value being used to regulate the speed of rotation of conveyor-belt roller 21 or 22, depending on the direction of travel of the dough. Selection of the optimum ratio of the conveyor-belt roller speed on the dough-feed side to the speed of rotation of dough rollers 14 and 15 is very important for preventing undulation or overstretching of the dough, the latter producing the "wire-drawing effect" mentioned earlier. When there is undulation, the speed of the measuring roller is less, and when the dough is pulled in between the dough rollers, it is greater, than the speed of whichever conveyor-belt roller is feeding the dough over the measuring roller to the dough rollers.

The drive of the individual rollers is shown diagrammatically in FIG. 3. The conveyor belt feeding the dough is driven by a DC motor 29 alternately over one or the other of the conveyor-belt rollers 21 and 22 by means of a toothed belt 30 and two toothed disks 31 and 32. Whichever of the measuring rollers 23 or 24 is on the dough-exit side is coupled to the associated conveyor-belt roller 21 or 22. An intermediate gear 35 is driven by means of a V-belt 34. A toothed belt 36 runs from intermediate gear 35 over two deflection pulleys 37 and 38 onto a toothed disk secured to adjustable upper dough roller 14 for rotation therewith. The left-hand pulley 37, as viewed in FIG. 3, is adjustable in height together with upper dough roller 14. A toothed belt 39 drives the lower dough roller 15. Whichever conveyor belt is on the exit side is further driven over conveyor-belt roller 21 or 22 via intermediate gear 35 by a toothed belt 40. Belt 40 runs over two toothed disks 41 and 42 coupled to the respective conveyor-belt roller, the toothed disk for the exit conveyor belt being coupled in each instance to the respective conveyor-belt roller. The height of the adjustable upper dough roller 14 is varied by means of a positioning motor 43 via a worm 44, a worm gear 45, and a spindle 46 and via a mounting 47.

FIG. 4 shows upper dough roller 14 with hand-protector 16. Connected to device 16 via a rotatingly flexible element 48a is a roll-stripper 48 which is swung out when the hand-protecting device is lifted, whereby cleaning of stripper 48 is made possible. Hand-protectors 16 and 17 are likewise displaced in their positions when the height of upper dough roller 14 is adjusted, so that when the gap between rollers 14 and 15 becomes so narrow that there would be a danger of injury to anyone's hand inserted between the rollers, protective devices 16 and 17 are situated so far down above dough conveyor belts 10 and 11 that there is no longer any possibility of touching rollers 14 and 15 with one's hand. If the hand-protectors are raised, the drive of the various rollers is automatically switched off.

FIG. 5 illustrates how the end of support 9 with conveyor belt 11 can be lifted for cleaning the underside of the conveyor belt and the underlying support. The end portion 50 of support 19 for conveyor belt 11 is swivelled upward about a pivot point 49 together with outer conveyor-belt roller 13, whereby belt 11 becomes slack. The same device is provided for the opposite conveyor-belt assembly 8, 10, and 12.

FIG. 6 shows the drive for folding carriage 7, which receives the rolled-out dough. Its outward movement is centrally controlled according to the dough-rolling operation. A rack 51 at the bottom of carriage 7 is driven by a schematically indicated DC motor 54 via a gear 53 and a pinion 52. The same drive is provided for the opposite folding carriage 6 as well.

Circuitry including a microprocessor, e.g., Intel 8048, is provided for the centralized control of the dough-rolling machine. The speeds of dough rollers 14 and 15 and of the conveyor-belt roller associated with the conveyor belt on the dough-exit side are unvarying, whereas the speed of the conveyor belt feeding the dough is centrally regulated by means of measuring roller 23 or 24, as the case may be. Narrowing of the gap between dough rollers 14 and 15 is also controlled centrally. The control of the speed of the entry conveyor belt by the measuring rollers would not in itself necessitate the use of a microprocessor. However, if the individual steps of the movable upper dough roller 14 are to be optimally controlled for narrowing the roller gap and thus lessening the thickness of the dough, a microprocessor is necessary. The movements of folding carriages 6 and 7, which receive the dough rolled out and placed on these carriages in folds, are likewise centrally controlled by means of the microprocessor.

The central control panel of the dough-rolling machine is depicted in FIG. 7. The upper and lower limits of the dough-roller gap are adjusted by means of buttons 55 and 56, these limits being displayed, e.g., by LEDs, in fields 57 and 58. Field 59 displays the momentary spacing of rolls 14 and 15. Various degrees of rolling down, e.g., ratios of 1:2, 1:1.55, or 1:1.3, can be selected by means of buttons 61, 62, and 63.

At the beginning of the rolling operation, it may be desirable to roll the dough out only to a certain length and then to rotate it by 90° on the conveyor belt, whereby the final width of the rolled-out dough can be determined. This initial length, or width, of the dough is adjusted by means of button 64 and displayed in a field 65, likewise by LEDs, for example. Thus, by means of buttons 55, 56, 61, 62, 63, and 64, data can be preselected, combined into a program, and stored in one of the locations 1–10 (keys 60).

By means of a light barrier (not shown) disposed diagonally between dough rollers 14 and 15, the entry and exit of the dough between these rollers is registered. The speed of dough rollers 14 and 15 is constant. The length of the rolled-out dough is determined as a function of time. In this way, the initial length rolled out, i.e., the desired width, can be controlled and preselected.

The light barrier is also used for controlling the coupling and disengagement of measuring rollers 23 and 24.

When the gap between dough rollers 14 and 15 is being narrowed, it is important for the ratio of the individual steps of upper dough roller 14 to conform to the associated speed of the conveyor belt 10 or 11 feeding the dough. For instance, if the thickness of the dough is to be reduced by half, the speed of the exit conveyor belt must be about twice that of the entry conveyor belt.

FIGS. 8 and 9 each depict a reduction of the roller gap by half through lowering of upper dough roller 14. In the example of FIG. 8, however, only a partial step or increment results, which would lead to stretching of the dough at the end if the speed of the entry conveyor belt were not controlled accordingly. In the example of FIG. 9, only a partial step or increment is selected at the beginning, so that in all the following steps the degree of rolling down is 1:2, so that the final result is a whole step for rolling out the dough to the end thickness. The partial step at the beginning has no disadvantageous influence since with a greater initial thickness and correspondingly short length of the dough, no disturbing effects such as undulation as yet occur.

Optimum rolling out of the dough is important since otherwise either the dough is destroyed by undulation or there is too much waste if the strip of dough shrinks in width.

FIG. 10 is a block diagram of circuitry for regulating the rate of travel of the dough on the entry conveyor belt. A first measurement signal generator 66 transmits one signal 70 per revolution of measuring roller 23, to which it is connected. Signal 70 is supplied to a comparator 67 for comparing the speed of the entry conveyor belt 10 with the actual rate of travel of the dough as measured by roller 23. The speed of belt 10 is supplied to comparator 67 via conveyor-belt roller 21 by means of a second measurement signal generator 68. Comparator 67 thus determines the difference between a signal 69 representing the belt speed and signal 70 representing the rate of dough travel. A reference value 72 is corrected in a corrector circuit 73 by means of a signal 71 representing the aforementioned difference. The resultant correcting variable 74 is supplied to a controller 75, which regulates the speed of rotation of belt drive 29 so that the speed of the entry dough conveyor belt 10 is in the correct ratio to the rate of travel of the dough. Comparator 67, corrector circuit 73, and controller 75 form part of a microprocessor 76.

In a dough-rolling machine having a number of pairs of rollers disposed in succession, and in which the dough is rolled out in only one pass, the control could be effected using only one measuring roller.

What is claimed is:

1. A dough-rolling machine comprising a pair of spaced dough rollers, reversible first and second transport means positioned on opposite sides of said dough rollers for transporting dough to and from said dough rollers in both forward and reverse directions, and first and second measuring rollers mounted on opposite sides of said dough rollers for engagement with the underside of said dough before it passes between said dough rollers in forward and reverse directions, respectively, for determining the actual rate of speed of said dough before it passes between said dough rollers in forward and reverse directions, respectively.

2. The dough-rolling machine of claim 1, further comprising a first folding carriage disposed beneath said first transport means and a second folding carriage disposed beneath said second transport means for receiving the rolled-out dough.

3. The dough-rolling machine of claim 2, further comprising drive means for moving said first and second folding carriages and a microprocessor for controlling said drive means.

4. The dough-rolling machine of claim 1, further comprising hand-protecting means, a stripper, and a rotatingly flexible element connecting said stripper to said hand-protecting means.

5. The dough-rolling machine of claim 1, wherein said first transport means and said second transport means each comprise a conveyor-belt assembly having inner and outer conveyor-belt rollers.

6. In the dough-rolling machine of claim 1, said first measuring roller being disposed between said first transport means and said dough rollers, said second measuring roller being disposed between said second transport means and said dough rollers.

7. The dough-rolling machine of claim 5, further comprising a pivoting transfer part disposed between one of said conveyor-belt rollers and an adjacent measuring roller.

8. The dough-rolling machine of claim 5, wherein said measuring roller is adapted to be coupled to and uncoupled from one of said conveyor-belt rollers.

9. The dough-rolling machine of claim 5, further comprising a signal generator connected to one of said measuring rollers for generating a measurement signal and a microprocessor means for controlling the speed of the adjacent conveyor-belt roller in dependence upon said measurement signal and for controlling the spacing between said dough rollers.

10. The dough-rolling machine of claim 5, wherein end portions of said first and second transport means are adapted to be swivellable together with said outer conveyor-belt rollers.

11. The dough-rolling machine of claim 1 further comprising means for controlling the speed of said first transport means as a function of the speed of said first measuring roller when said machine is operated in a forward direction.

12. A dough-rolling machine comprising
at least two spaced dough rollers,
first transport means for feeding the dough to said dough rollers and including a conveyor-belt assembly having inner and outer conveyor-belt rollers,
second transport means for conveying the dough away from said dough rollers and including a conveyor-belt assembly having inner and outer conveyor-belt rollers,
at least one measuring roller for measuring the actual rate of travel of the dough prior to passage thereof between said two dough rollers,
a signal generator means connected to said measuring roller for generating a measurement signal, and
a microprocessor means for controlling the speed of one of said conveyor-belt rollers in dependence upon said measurement signal and for controlling the spacing between said dough rollers.

13. The dough-rolling machine of claim 12, further comprising a first folding carriage disposed beneath said first transport means, a second folding carriage disposed beneath said second transport means for receiving the rolled-out dough, and drive means for moving said first and second folding carriages, said microprocessor further controlling said drive means.

* * * * *